United States Patent Office 3,652,739
Patented Mar. 28, 1972

3,652,739
(CIS-1,2-EPOXYPROPYL)PHOSPHONIC
ACID INTERMEDIATES
Peter I. Pollak, Scotch Plains, Norman L. Wendler, Summit, and Burton G. Christensen, Scotch Plains, N.J., assignors to Merck & Co., Inc., Rahway, N.J.
No Drawing. Continuation-in-part of application Ser. No. 729,424, May 15, 1968. This application Aug. 27, 1968, Ser. No. 755,729
Int. Cl. C07f 9/38, 9/40
U.S. Cl. 260—948
10 Claims

ABSTRACT OF THE DISCLOSURE

A method for the preparation of (±) and (—) (cis-1,2-epoxypropyl)phosphonic acid and its corresponding salts and ester derivatives which comprises treating a 1,2-disubstituted n-propylphosphonic acid or a salt or ester thereof under ring closure conditions, at least one of which substitutents is hydroxy or a functionally equivalent oxygen-containing moiety and the remaining substituent being any leaving group which can be displaced to yield the desired epoxide product.

The (±) and (—) (cis-1,2-epoxypropyl)phosphonic acid of this invention and its salts are antibiotics which have utility as antibacterials in inhibiting the growth of gram-positive and gram-negative pathogenic bacteria.

---

This application is a continuation-in-part of application Ser. No. 729,424, filed May 15, 1968.

This invention relates to a novel method for the preparation of (±) and (—) (cis-1,2-epoxypropyl)phosphonic acid and the salts and ester derivatives thereof via the ring closure of a 1,2-disubstituted n-propylphosphonic acid.

The (±) and (—) (cis-1,2-epoxypropyl)phosphonic acid product of the instant process and its salts are antibacterial agents, which are useful in inhibiting the growth of both gram-positive and gram-negative pathogenic bacteria. The (—) form of the product, and particularly its salts such as the sodium and calcium salts, is active against Bacillus, Escherichia, Staphylococci, Salmonella and Proteus pathogens, and antibiotic-resistant strains thereof. Illustrative of such pathogens are *Bacillus subtilis*, *Escherichia coli*, *Salmonella schottmuelleri*, *Salmonella gallinarum*, *Salmonella pullorum*, *Proteus vulgaris*, *Proteus mirabilis*, *Proteus morganii*, *Staphylococcus aureus* and *Staphylococcus pyogenes*. Thus, (±) and (—) (cis-1,2-epoxypropyl)phosphonic acid and its salts can be used as antiseptic agents to remove susceptible organisms from pharmaceutical, dental and medical equipment and can also be used in other areas subject to infection by such organisms. Similarly, they can be used to separate certain microorganisms from mixtures of microorganisms. The salts of (—) (cis-1,2-epoxypropyl)phosphonic acid are particularly valuable because not only do they have application in the treatment of diseases caused by bacterial infections in man and animals but they are active against resistant strains of pathogens. The said salts constitute a preferred embodiment of this invention because they are effective when given orally although it is to be noted that they can also be administered parenterally.

In accordance with this invention (±) and (—) (cis-1,2-epoxypropyl)phosphonic acid and the salts and ester derivatives thereof (I, infra) are obtained by treating a 1,2-disubstituted n-propylphosphonic acid, its salts or an ester thereof (II, infra) under conditions suitable for effecting epoxide-type ring closure. At least one of the substituents in the 1 and/or 2 position of the n-propyl-phosphonic acid reactant (II) must be an hydroxy radical or other functionally equivalent oxygen-containing substituent which will undergo ring closure to form the epoxide nucleus; the remaining substituent may be any leaving group which under the conditions of the reaction can be displaced to yield the desired epoxide product (I). The following equation illustrates this method of preparation:

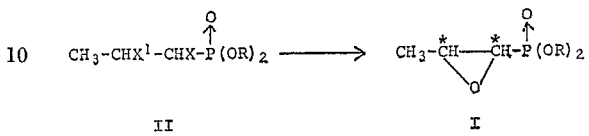

wherein the two R radicals may be the same or different and represented hydrogen, lower alkyl such as methyl, ethyl, n-propyl, isopropyl, n-butyl, and the like, lower alkenyl such as allyl and the like, mononuclear aryl such as phenyl or mononuclear aralkyl such as benzyl, phenethyl and the like and, when R is hydrogen, salts of the resulting acid, for example, those salts derived from the metals in Groups Ia, IIa, Ib and IIb of the Periodic System such as the alkali metal and alkaline earth metal salts, for example, the mono- and di-sodium salts, the mono- and dipotassium salts, the mono- and di-silver salts and the calcium, magnesium and cadmium salts and amine salts such as those derived from α-phenethylamine, quinine, brucine, lysine, protamine, arginine, procaine, ethanolamine, morphine, benzylamine, ethylenediamine, N,N′-dibenzylethylenediamine, glycine, and the like and salts derived from such biologically active amides as tetracycline and novobiocin; and X and X¹ are hydroxy, halo, for example, chloro, bromo, iodo and the like, azido, lower alkanoyloxy, for example, acetoxy, propionyloxy and the like, trihalomethyl substituted lower alkanoyloxy such as trichloroacetoxy, trifluoroacetoxy, 3,3,3 - trifluoropropionyloxy, 3,3,3 - trichloropropionyloxy and the like, hydrocarbylsulfonyloxy such as lower alkanesulfonyloxy, for example, methanesulfonyloxy, ethanesulfonyloxy and the like, arylsulfonyloxy, for example, phenylsulfonyloxy, and the like alkarylsulfonyloxy, for example, tolylsulfonyloxy and the like, aralkylsulfonyloxy, for example, benzenesulfonyloxy and the like, aroyloxy, for example, benzoyloxy, 4-toluyloxy, 2-naphthoyloxy and the like, aralkanoyloxy, for example, benzylcarbonyloxy, naphthylcarbonyloxy and the like, tri-lower alkylammonium, for example, trimethylammonium, triethylammonium and the like, N-cycolalkyl di-lower alkylammonium wherein the cycloalkyl radical is mono-nuclear cycloalkyl containing 5–6 nuclear carbon atoms such as cyclopentyl, cyclohexyl and the like, and di-lower alkylsulfonium, for example, dimethylsulfonium, diethylsulfonium, di-n-butylsulfonium and the like, aryloxy, for example, phenoxy and the like, dialkoxyphosphino, for example, di-lower alkoxyphosphino such as diethoxyphosphino and the like, N - (alkanesulfonyl)alkylamino or N-(alkarylsulfonyl)-cycloalkylamino wherein the cycloalkyl radical is mono-nuclear cycloalkyl containing from 5–6 nuclear carbon atoms, for example, N-(p-toluenesulfonyl)cyclohexylamino and the like, at least one of which X and X¹ radicals is hydroxy or other functionally equivalent oxygen-containing radical as, for example, an acryloxy group such as lower alkanoyloxy, trihalomethyl substituted lower alkanoyloxy, aroyloxy, aralkanoyloxy and the like, which, under ring closure conditions, will form the desired epoxide ring.

In addition to the pharmacologically acceptable metal and amine salts of (cis-1,2-epoxypropyl)phosphonic acid described above, this invention also includes other salts of the said acid inasmuch as those derivatives can be used as intermediates in synthesizing the free (cis-1,2-epoxypropyl)phosphonic acid and its pharmacologically acceptable salts by metathesis. Furthermore, the salt of any optically active amine, is within the scope of this invention inasmuch as it has utility as an intermediate in resolving racemic (cis-1,2-epoxypropyl)phosphonic acid into its optically active stereoisomers. Thus, for example, (±) (cis-1,2-epoxypropyl)phosphonic acid may be resolved into its (+) and (−) enantiomers via the formation of a salt with an optically active amine salt by separation of the diastereoisomers of the said salt and regeneration of the (+) and (−) enantiomers of (cis-1,2-epoxypropyl)phosphonic acid. If desired, the (+) (cis-1,2-epoxypropyl)phosphonic acid thus obtained may be converted to the antibacterially active (−) (cis-1,2-epoxypropyl)phosphonic acid by cleavage of the epoxide ring to form a 1,2-disubstituted n-propylphosphonic acid (II) which may be converted to the desired (−) stereoisomer according to the method of this invention. The synthetic method for the conversion of pharmacologically inactive (+) (cis-1,2-epoxypropyl)phosphonic acid to its corresponding antibacterially active (−) stereoisomer is illustrated by the specific embodiments which comprise the examples in this specification.

Since the ring carbons in the (cis-1,2-epoxypropyl)-phosphonic acid (I) are asymmetric carbons (starred, supra) it follows that the product (I) may exist as one or more of four optically active isomers as shown by the following formulae:

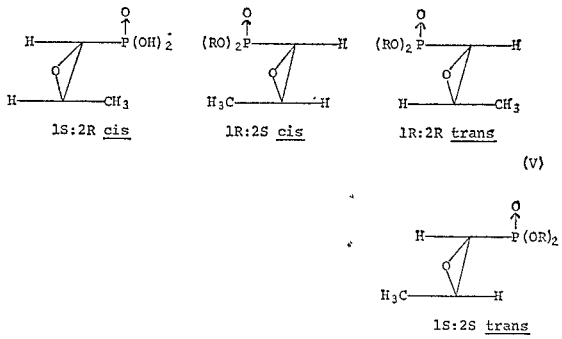

Of the four isomers the 1R:2S, i.e., (−) (cis-1,2-epoxypropyl)phosphonic acid, has proved to be most effective in inhibiting the growth of pathogenic bacteria and, therefore, the preparation of that particular derivative constitutes a preferred embodiment of this invention. To effect the synthesis of that isomer or any other isomeric derivative, it is only necessary to select as the reactant in the process the appropriately resolved starting material.

In principle the instant process proceeds via an intramolecular displacement of the X or $X^1$ substituents attached to the asymmetric carbons of the phosphoinc acid reactant (II) by the neighboring oxygen substituent. As a consequence, the process results in a net inversion of the starting material configuration at one or the other of the said asymmetric centers depending largely upon the character of the X and $X^1$ substituents attached to the alkylene chain of the n-propylphosphonic acid starting material (II). This inversion of configuration is best illustrated by the following formulae which show the two asymmetric carbons in the reactants (II) to be so oriented that they lie in the projection plane and the hydrogen and X and $X^1$ moieties are above or below the said plane. Also, because of the two asymmetric carbons the reactants can be represented as two series of compounds containing two pairs of enantiomeric diastereoisomers in each series. Thus, in the A series, infra, the oxygen-containing radical is bonded to the 2-carbon in the n-propylphosphonic acid molecule and there exists in that series two pairs of enantiomeric diastereoisomers, i.e., the 1R:2S erythro and 1S:2R erythro enantiomers on the one hand and the 1S:2S threo and 1R:2R threo on the other, with each pair of enantiomers having identical physical and chemical properties except for the direction in which they rotate the plane of polarized light. Similarly, in series B, infra, where the oxygen-containing moiety is bonded to the 1-carbon of the n-propylphosphonic acid reactant there exist two pairs of enantiomers, i.e., the 1R:2S erythro and 1S:2R erythro isomers and the 1S:2S threo and 1R:2R threo isomers. For purposes of illustration the following formulae depict the oxygen-containing radical as an $O^\ominus$ moiety; however, this is for illustration only and it will be obvious to those skilled in the art that in fact the said moiety may be any one of the oxygen-containing substituents cited above in respect of the definition of X and $X^1$:

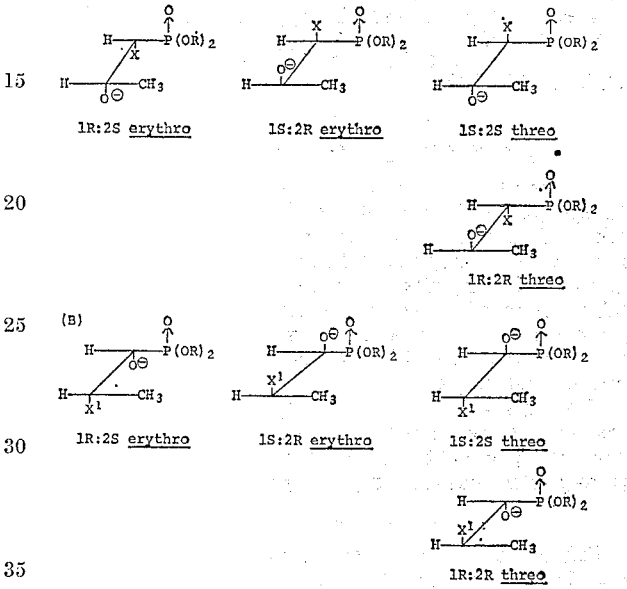

wherein $O^\ominus$, R, X and $X^1$ are as defined above.

Epoxide formation is effected (1) by treating the 1,2-disubstituted n-propylphosphonic acid starting material (II) with a suitable acid such as sulfuric acid, peracetic acid, hexafluoroacetone acid or nitrous acid and the like or with a Lewis acid such as boron trifluoride or phosphorous pentoxide and the like or (2) with a solution of an ionizable metal in a neutral or acidic solution as, for example, with silver acetate in a mineral acid such as hydrochloric acid and the like or (3) by treatment with a base having a pH equal to or greater than 7; suitable bases include, for example, alkali metal or alkaline earth metal hydroxides such as sodium hydroxide, potassium hydroxide, calcium hydroxide, magnesium hydroxide, etc., alkali metal or alkaline earth metal carbonates or bicarbonates such as sodium carbonate, potassium carbonate, calcium carbonate, sodium bicarbonate, potassium bicarbonate, etc., basic metal oxides such as sodium oxide, potassium oxide, calcium oxide, cadmium oxide, gold oxide, silver oxide, etc., tertiary organic bases, for example, tertiary alkylamines such as trimethylamine, triethylamine, pyridine, etc., quaternary ammonium bases, for example, tri-lower alkylammonium alkoxides such as trimethylammonium methoxide, triethylammonium ethoxide, etc., alkali metal or alkaline earth metal alkoxides such as sodium methoxide, sodium ethoxide, potassium ethoxide, potassium tert.-butoxide and the like or Lewis bases in aprotic solvents such as peroxide ion in acetonitrile or (4) by passing a solution of the starting material through an ion-exchange column on the basic cycle. When an optically active starting material selected from the series A or B, supra, is subjected to epoxide formation in an alkaline, acid or neutral medium the reaction proceeds with a net inversion of the configuration of the carbon atom bearing the leaving substituent X or $X^1$. Thus, when it is desired to obtain the optically active 1R:2S erythro (cis-1,2-epoxypropyl)phosphonic acid isomer it is only necessary to select as the starting material the 1S:2S threo precursor in the A series (supra) or the 1R:2R threo precursor in the B series (supra) since those isomers will, upon inversion, yield the desired 1R:2S erythro product. The result is a process proceeding with a net single inversion of configuration at the carbon atom bearing the leaving group X or X¹. The following equation wherein the starting material is a 1S:2S threo-2-hydroxy substituted n-propylphosphonic acid or a salt or ester derivative thereof (IIa, infra) illustrates this reaction; however, it is to be understood that the corresponding 1R:2R threo-1-hydroxy substituted n-propylphosphonic acid isomer or any other functionally equivalent oxygen-containing reactant may be substituted therefor in an otherwise analogus reaction to yield an identical 1R:2R erythro product (Ia, infra) and, if desired, any other isomeric derivative or a racemic mixture of isomers may be employed to yield the correspondingly inverted or racemic product:

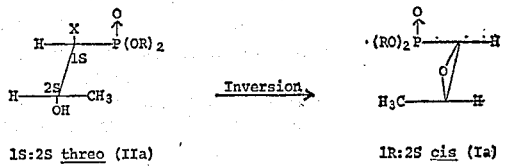

1S:2S threo (IIa)    1R:2S cis (Ia)

wherein R and X are as defined above and, when R in the starting material (IIa) is hydrogen, the product (Ia) is obtained in the form of the corresponding salt.

Also, in addition to a single step inversion this invention includes syntheses of two steps or more in which the 1,2-disubstituted n-propylphosphonic acid reactant may be prepared in situ and the precursor thus obtained can be converted to the desired epoxide product (I) via the instant process. Thus, for example, in the preparation of the instant 1(2)-hydroxy-2(1)-halo-substituted-n-propylphosphonic acid starting materials a 1(2)-hydroxy-2(1)-chloro-n-propylphosphonic acid may be first synthesized as an initial intermediate and the precursor thus obtained can be converted to its corresponding 1(2)-hydroxy-2(1)-iodo-n-propylphosphonic acid analog and the latter intermediate converted to the desired (cis-1,2-epoxypropyl)phosphonic acid product (I) according to the process of this invention.

The 1,2-disubstituted n-propylphosphonic acid reactants (II) of the instant process and the salts and ester derivatives thereof are conveniently obtained by several alternate routes. One such method of preparation and one which is suitable for preparing those reactants wherein the oxygen-containing moiety is bonded to the 1-carbon of the n-propylphosphonic acid molecule, comprises treating phosphorous acid or a salt or ester of phosphorous acid with a propionaldehyde which is substituted at the 2-carbon by an appropriate leaving group (III, infra). The following equation illustrates this method of preparation:

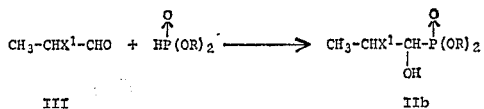

III    IIb wherein R and X¹ are as defined above. Alternatively, in lieu of a propionaldehyde and the phosphorus acid derivatives described above the [1-hydroxy-2-(X¹-substituted) n-propyl]phosphonic acid derivatives may be obtained via the reaction of a suitably substituted propionyl halide with a phosphite and the (2-X¹-substituted propionyl)phosphonate thus obtained is reduced as, for example, by treatment with sodium borohydride to yield the desired [1-hydroxy-2-(X¹-substituted)n-propyl]phosphonic acid derivative. The 1,2-disubstituted n-propylphosphonic acid (IIb) or its salt or ester derivative thus obtained may be used directly as the starting material in the process of this invention or, if desired, the said [1-hydroxy-2-(X¹-substituted) n-propyl]phosphonic acid (IIb) may be treated with a suitable esterifying agent as, for example, with an alkanoyl halide, trihalomethyl substituted lower alkanoyl halide, aroyl halide, aralkanoyl halide, lower alkanesulfonyl halide, etc. to yield the corresponding [1-acyloxy-2-(X¹-substituted)n-propyl]phosphonic acid or [1-lower alkanesulfonyloxy-2-(X¹-substituted)n-propyl]phosphonic acid or the salt and ester derivatives thereof. The following equation illustrates such a method for the preparation of a [1-lower alkanesulfonyloxy-2-(X¹-substituted)n-propyl]phosphonic acid derivative (IIc) via the reaction of the corresponding [1-hydroxy-2-(X¹-substituted)n-propyl]phosphonic acid (IIb) with a lower alkanesulfonyl halide; however, it is to be understood that the equation is illustrative only and that the other corresponding [1-acyloxy-2-(X¹-substituted)n-propyl]phosphonic acid analogs thereof and their salts and esters may also be obtained in an analogous manner simply by substituting the appropriate acyl halide for the lower alkanesulfonyl halide described as the starting material therein:

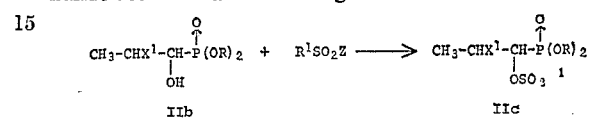

IIb    IIc wherein $R^1$ is lower alkyl such as methyl, ethyl, n-propyl, etc., aryl such as phenyl, tolyl and the like or aralkyl such as benzyl; Z is halo, for example, chloro, bromo, fluoro, and the like and R and $X^1$ are as defined above.

The (1-hydroxy-2-sulfonyloxypropyl)phosphonic acid starting materials may be prepared by treating an appropriately substituted 2-sulfonyloxypropionyl halide with a phosphite, followed by the reaction of the resulting (2-sulfonyloxypropionyl)phosphonate intermediate thus obtained with a suitable reducing agent such as sodium borohydride:

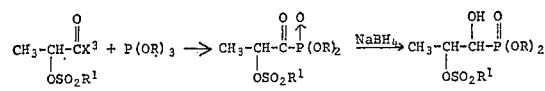

wherein $X^3$ is halo such as chloro, bromo and the like and R and $R^1$ are as defined above. The 2-sulfonyloxypropionyl halides employed as starting materials in the foregoing process are conveniently obtained via the reaction of a lactic acid ester with an appropriate sulfonyl halide followed by the halogenation of the 2-sulfonyloxypropionate intermediate thus obtained to the desired 2-sulfonyloxypropionyl halide.

Those 1,2-disubstituted n-propylphosphonic acid derivatives wherein a dialkylsulfonium radical is bonded to the 2-carbon of the n-propylphosphonic acid moiety (IIe, infra) are conveniently obtained by treating a [1-hydroxy-2-(alkylthio)propyl]phosphonate (IId, infra) with an alkyl halide. The following equation illustrates this method of preparation, including the step of synthesizing the [1-hydroxy-2-(alkylthio)propyl]phosphonate intermediate (IId) via the aforedescribed method of treating a suitably substituted propionaldehyde (IIIa, infra) with phosphorus acid or with the corresponding phosphite derivative:

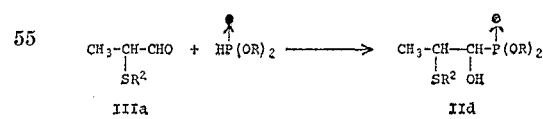

IIIa    IId

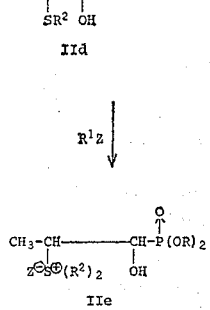

IIe wherein $R^2$ is lower alkyl such as methyl, ethyl, n-propyl and the like, $R^1Z$ is a lower alkyl halide such as methyl iodide, methyl fluoride, ethyl iodide, ethyl chloride, ethyl bromide, n-propyl iodide, etc., $Z^{\ominus}$ is the anion derived from halogen such as chloro, bromo, fluoro or iodo and R is as defined above.

Alternatively, those 1,2 - disubstituted n-propylphosphonic acid reactants wherein the sulfonium radical is bonded to the 1-carbon of the propyl phosphonic acid (IIg, infra) may be obtained by treating (1-propenyl) phosphonic acid or a salt or ester thereof with a sulfenyl halide, followed by the reaction of the [(1-phosphinyl)1, 2-propylene]-alkylsulfonium halide intermediate (IV, infra) thus obtained with the metal salt of an alkanoic acid to yield the corresponding [1-(alkylthio)-2-alkanoyloxypropyl]phosphonic acid or phosphonate derivative thereof (IIf, infra) which is then treated with an alkyl halide to yield the desired [1-hydroxy-2-(dialkylsulfonium)propyl]phosphonic acid (IIg). The following equation illustrates this method of preparation:

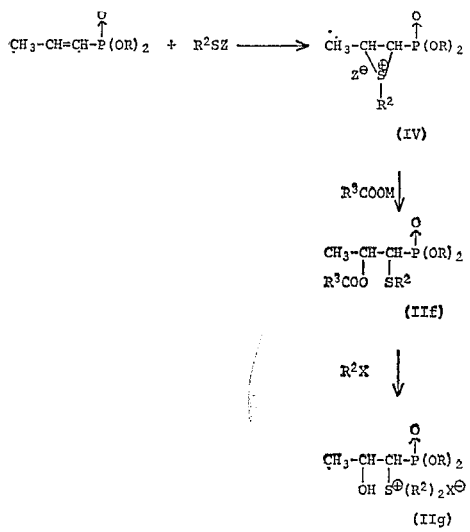

wherein $R^2X$ is a lower alkyl halide such as methyl iodide, ethyl iodide, n-propyl iodide, n-butyl iodide, methyl chloride, n-propyl chloride, etc.; $R_2SZ$ is a lower alkylsulfenyl halide such as n-butylsulfenyl chloride and the like; $R^3$ is lower alkyl such as methyl, ethyl, n-propyl, n-butyl, etc.; $R_3COOM$ is the metal salt of a lower alkanoic acid such as silver acetate, sodium n-propionate, silver n-butyrate, etc.; $X^\ominus$ is the anion derived from halogen such as chloro, bromo, fluoro or iodo; and $R$, $R_2$, $Z$ and $Z^\ominus$ are as defined above.

Still another method by which the 1,2-disubstituted n-propylphosphonic acid reactants (II) may be synthesized and one which is suitable for preparing those derivatives wherein an oxygen-containing radical is bonded to the 2-carbon of the n-propylphosphonic acid molecule (IIh, infra) comprises treating 1-propenylphosphonic acid or a salt or ester thereof (V, infra) with a reagent which will add an oxygen-containing moiety and a leaving group across the vinylene double bond of the 1-propenyl radical. Whether the reaction proceeds by direct addition or via a multi-step synthesis depends largely upon the character of the oxygen-containing substituent and the leaving group in the 1,2-disubstituted n-propylphosphonic acid compound. For example, any 1,2-disubstituted n-propylphosphonic acid wherein the oxygen-containing substituents are hydroxy and an alkanoyloxy or trihalomethyl substituted alkanoyloxy may be prepared simply by treating the 1-propenylphosphonic acid or a salt or ester thereof with an alkanoic peracid and anhydrous mineral acid or with an appropriate trihalomethyl substituted alkanoic acid in the presence of a peracid such as perbenzoic acid. Also, in the equation which follows both the hydroxy radical and the alkanoyloxy and trihalomethylalkanoyloxy moieties function as oxygen-containing substituents; therefore, the instant process constitutes an effective method for the preparation of starting materials which may contain up to two oxygen-containing moieties in the n-phosphonic acid molecule and, when the said reactant contains only one such oxygen-containing moiety, that radical is bonded to the 2-carbon of the said acid:

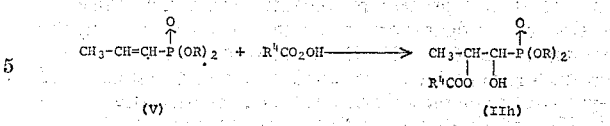

wherein $R^4$ is lower alkyl such as methyl, ethyl, etc., trihalomethyl such as trifluoromethyl, trichloromethyl, etc., or trihalomethyl substituted lower alkyl such as 2,2,2-trifluoroethyl, 2,2,2-trichloroethyl, etc., and $R$ is as defined above.

When the leaving group in the 1,2-disubstituted n-propylphosphonic acid reactant (II) is halogen and the oxygen-containing substituent is attached to the 2-carbon, the said starting material can be obtained by treating a 1-propenylphosphonate with an aqueous solution of an halogenating agent. The following equation wherein the reagents employed are no-bromosuccinimide and aqueous sulfuric acid illustrates this process; however, it will be obvious to one skilled in the art that other functionally equivalent halogenating agents can be substituted therefore in an otherwise analogous process to yield the corresponding (1 - halo-2-hydroxypropyl)phosphonate derivative (IIi, infra):

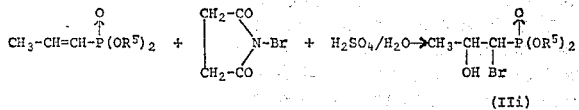

wherein $R^5$ is an hydrocarbyl radical such as lower alkyl, lower alkenyl, mononuclear aryl, mononuclear aralkyl or a cation derived from an alkali metal or alkaline earth metal.

Those 1,2-disubstituted n-propylphosphonic acid reactants wherein the leaving group is a substituted amino radical and the oxygen-containing substituent is attached to the 2-carbon of the n-propylphosphonic acid molecule (IIj, infra) are prepared via the reaction of a 1-propenylphosphonate with a suitable halogenating agent such as bromine in chloroform in the presence of a suitable primary amine and the (1-primary-amino-2-methyl-3-aziridinyl)-phosphonate intermediate (VI, infra) thus obtained is then hydrolyzed by treatment with an aqueous solution of an acid to yield the desired [1-(primary amino)-2-hydroxypropyl]-phosphonate (IIj). The following equation illustrates this method of preparation:

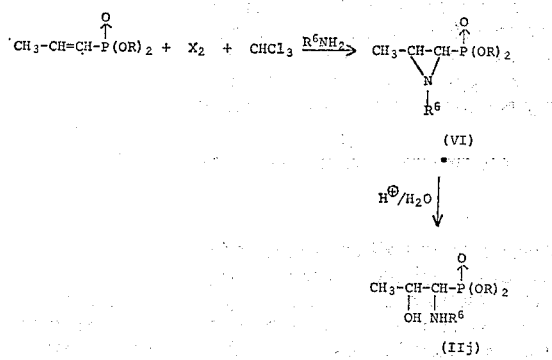

wherein $R^6$ is alkyl, or mononuclear cycloalkyl such as cyclopentyl, cyclohexyl, etc., $X_2$ is an halogenating agent such as chlorine, bromine, etc. and $H^\oplus$ is the cation derived from an organic or inorganic acid such as paratoluenesulfonic acid, hydrochloric acid, sulfuric acid, and the like.

Alternatively, in lieu of treating the (1-primary-amino-2-methyl-3-aziridinyl)phosphonate intermediate (VI) of the foregoing method, with an aqueous solution of an acid, the said intermediate (VI) can be treated with the alkali metal salt of a suitable alkanoic acid, as for example, with sodium acetate, in an acidic medium to afford the corresponding [1-(primary-amino)-2-alkanoyloxypropyl]phosphonate (VII, infra), which intermediate can then be treated with an appropriate sulfonyl halide in a suitable solvent such as pyridine to yield the desired {1-[N-(hydrocarbylsulfonyl) - primary - amino]-2-alkanoyloxypropyl} phosphonate (IIk, infra). The following equation wherein the sulfonyl halide reagent employed is p-toluenesulfonyl chloride illustrates this method of preparation:

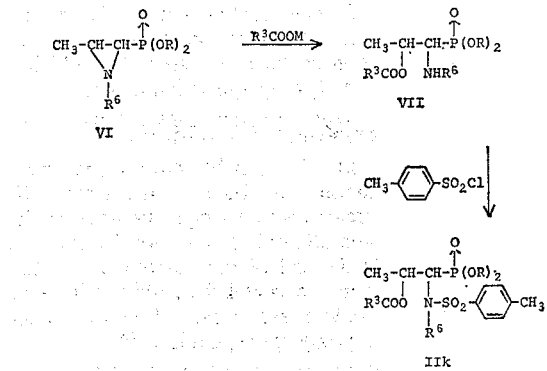

wherein R, R³COOM and R⁶ are as defined above.

The (—) (cis-1,2-epoxypropyl)phosphonic acid referred to herein rotates plane-polarized light in a counter-clockwise direction (to the left as viewed by the observer) when the rotation of its disodium salt is measured in water (5% concentration) at 405 mµ.

The designation cis used in describing the 1,2-epoxypropylphosphonic acid compounds means that each of the hydrogen atoms attached to carbon atoms 1 and 2 of the propylphosphonic acid are on the same side of the oxide ring.

The following examples illustrate the method by which (cis-1,2-epoxypropyl)phosphonic acid and its salts and ester derivatives (I) may be obtained. However, the examples are illustrative only and should not be construed as being limited thereto since other functionally equivalent reagents may be substituted for the reagents recited therein to yield an identical (cis-1,2-epoxypropyl)phosphonic acid product and its corresponding salts and ester derivatives.

EXAMPLE 1

(Cis-1,2-epoxypropyl)phosphonic acid, dimethyl ester and disodium salt

STEP A: THREO DIMETHYL (1-HYDROXY-2-CHLOROPROPYL)PHOSPHONATE 2-chloropropionaldehyde (5 mmoles) is added to dimethyl phosphite (5 mmoles) and the reaction mixture warmed to 50–60° C. After a period of 24 hours, the reaction product is distilled to yield threo dimethyl (1-hydroxy-2-chloropropyl)phosphonate.

STEP B: DIMETHYL (CIS-1,2-EPOXYPROPYL) PHOSPHONATE

A solution of threo dimethyl (1-hydroxy-2-chloropropyl)phosponate (0.124 g.) in methanol (2 cc.) is titrated with 1.08 N sodium hydroxide (0.5 cc.) using phenolphthalein as the indicator. The total amount of base consumed is 0.5 cc. Upon evaporation of the methanol at 25° C. and extraction of the residue with ether the solution yields upon concentration of the ether in vacuo, a product identified as dimethyl (cis-1,2-epoxypropyl) phosphonate.

STEP C: (CIS-1,2-EPOXYPROPYL)PHOSPHONIC ACID AND DISODIUM SALT

A solution of dimethyl (cis-1,2-epoxypropyl)phosphonate (1 mmole) in trimethylchlorosilane (10 cc.) is refluxed for eight hours. The reaction mixture is then extracted with water to yield an aqueous solution of (cis-1,2-epoxypropyl)phosphonic acid and the said product is then treated with two equivalents of sodium hydroxide and the solution evaporated to yield disodium (cis-1,2-epoxypropyl)phosphonate.

By substituting diallyl phosphite for the dimethyl phosphite recited in Example 1, Step A, and following the procedure described therein the intermediate threo diallyl (1 - hydroxy - 2 - chloropropyl)phosphonate is obtained, which upon treatment with sodium hydroxide according to the method described in Example 1, Step B, yields diallyl (cis - 1,2 - epoxypropyl)phosphonate. The diallyl ester thus obtained can then be subjected to hydrogenolysis or treated with trimethylchlorosilane and with lithium hydroxide according to the method described in Example 1, Step C, to yield, respectively, an aqueous solution of (cis-1,2-epoxypropyl)-phosphonic acid and dilithium (cis-1,2-epoxypropyl)phosphonate.

EXAMPLE 2

Diethyl (cis-1,2-epoxypropyl)phosphonate

STEP A: THREO DIETHYL (1-HYDROXY-2-ACETOXYPROPYL)PHOSPHONATE

A solution of 2-acetoxypropionaldehyde (5 mmoles) in benzene (5 cc.) is treated with diethyl phosphite (5 mmoles) and two drops of triethylamine. After a period of 20 hours, benzene is added and the organic solution is washed with dilute hydrochloric acid and then with water and dried over magnesium sulfate. Evaporation of the solvent followed by distillation of the residue yields threo diethyl (1-hydroxy-2-acetoxypropyl)phosphonate.

STEP B: THREO DIETHYL [1-(METHANESULFONYLOXY)-2-ACETOXYPROPYL]PHOSPHONATE

Threo diethyl (1 - hydroxy - 2-acetoxypropyl)phosphonate (2 mmoles) is dissolved in pyridine (10 cc.) and the solution treated with 1.1 equivalents of methanesulfonyl chloride and allowed to stand for 12 hours at room temperature. At the end of the 12-hour period, the pyridine is evaporated in vacuo and the residue dissolved in ether and the ether solution washed with water, dried and evaporated to yield crude diethyl [1-(methanesulfonyloxy)-2-acetoxypropyl]phosphonate.

STEP C: DIETHYL (CIS-1,2-EPOXYPROPYL) PHOSPHONATE

A solution of diethyl [1-(methanesulfonyloxy)-2-acetoxypropyl]phosphonate (1 mmole) in methanol (2 cc.) is titrated with 1 N sodium hydroxide using phenolphthalein as indicator. The total amount of base consumed is 2.0 mmoles. Upon evaporation of the methanol at 25° C., extraction of the residue with ether and concentration of the ether in vacuo, the product obtained is identified as diethyl (cis-1,2-epoxypropyl)phosphonate.

EXAMPLE 3

Dimethyl (cis-1,2-epoxypropyl)phosphonate

STEP A: DIMETHYL [1-HYDROXY-2-(METHANESULFONYLOXY)PROPYL]PHOSPHONATE

A solution of 2-hydroxypropionaldehyde (0.01 mole) in pyridine (10 cc.) is treated at 0–5° C. with methanesulfonyl chloride (0.012 mole) and allowed to stand for 18 hours at 0–5° C. The reaction mixture is then decomposed with ice and extracted with ether. The ether extract is washed free of pyridine with cold dilute hydrochloric acid and finally with a saturated salt solution and dried over magnesium sulfate. Evaporation of the solvent yields the mesylate ester of 2-hydroxypropionaldehyde and 5 mmoles of the product thus obtained is treated with dimethyl phosphite (5 mmoles) and warmed to 50–60° C. and allowed to stand for one day whereupon there is obtained threo dimethyl [1-hydroxy-2-(methanesulfonyloxy)propyl]phosphonate.

STEP B: DIMETHYL (CIS-1,2-EPOXYPROPYL) PHOSPHONATE

By substituting threo dimethyl [1-hydroxy-2-(methanesulfonyloxy)propyl]phosphonate for the dimethyl [1-(methanesulfonyloxy) - 2-acetoxypropyl]phosphonate of Example 2, Step C, and following the procedure described therein employing 1 milli-equivalent of alkali the product dimethyl (cis-1,2-epoxypropyl)phosphonate is obtained.

EXAMPLE 4

Di-n-propyl (cis-1,2-epoxypropyl)phosphonate

STEP A: THREO DI-n-PROPYL (1-HYDROXY-2-AMINO-PROPYL)PHOSPHONATE

A solution of 2-aminopropionaldehyde (5 mmoles) and di-n-propyl phosphite (5 mmoles) in benzene (5 cc.) is allowed to stand for 18 hours. The solvent is evaporated and the residue distilled to yield threo di-n-propyl (1-hydroxy-2-aminopropyl)phosphonate.

STEP B: [(1-DI-n-PROPYLOXYPHOSPHINYL) - 1 - HYDROXY-2-PROPYL]TRIMETHYLAMMONIUM IODIDE

A solution of threo di-n-propyl (1-hydroxy-2-aminopropyl)phosphonate (2 mmoles) in 20 cc. of methanol is treated with methyl iodide (10 mmoles) and 10 percent aqueous potassium hydroxide (12 mmoles) is added dropwise with stirring. The alcohol is evaporated and replaced with benzene which is evaporated to azeotrope the reaction mixture to dryness. The residue suspended in benzene (20 cc.) is treated with methyl iodide (10 mmoles) and refluxed for two hours. At the conclusion of the 2-hour period the reaction mixture is evaporated to dryness to yield [(1 - di - n - propyloxyphosphinyl)-1-hydroxy-2-propyl]trimethylammonium iodide.

STEP C: DI-n-PROPYL (CIS-1,2-EPOXYPROPYL)PHOSPHONATE

The [(1 - di - n - propyloxyphosphinyl) - 1 - hydroxy-2-propyl]trimethylammonium iodide obtained according to Step B is suspended in methanol and treated with freshly prepared silver oxide (50 mmoles). The reaction mixture is stirred for two hours at room temperature, filtered and the filtrate evaporated to dryness. The residue is dissolved in ether and the ether washed with 5% sodium bicarbonate solution, dried over magnesium sulfate, filtered and concentrated to yield di-n-propyl (cis-1,2-epoxypropyl)phosphonate.

EXAMPLE 5

Di-n-butyl (cis-1,2-epoxypropyl)phosphonate

STEP A: THREO DI-n-BUTYL [1-HYDROXY-2-(ETHYLTHIO)PROPYL]PHOSPHONATE 2-(ethylthio)propionaldehyde (5 mmoles) and di-n-butyl phosphite (5 mmoles) is treated with two drops of triethylamine and allowed to stand at 30° C. for 20 hours. The reaction mixture is warmed at 50–60° C. for one hour, cooled to room temperature, taken up in ether and the triethylamine removed by extraction with dilute hydrochloric acid. The washed ether solution is dried over magnesium sulfate, concentrated and the residue distilled under reduced pressure to yield threo di-n-butyl [1-hydroxy-2-(ethylthio)propyl]phosphonate.

STEP B: THREO [(1-DI-n-BUTYLOXYPHOSPHINYL)-1-HYDROXY-2-PROPYL]DIETHYLSULFONIUM IODIDE

Di-n-butyl [1 - hydroxy - 2-(ethylthio)propyl]phosphonate (3 mmoles) is disolved in benzene and the solution treated with ethyl iodide (10 mmoles). The reaction mixture is then warmed at 80° C. for two hours and the benzene evaporated in vacuo to yield threo [(1-di-n-butyloxyphosphinyl) - 1 - hydroxy-2-propyl]diethylsulfonium iodide.

STEP C: DI-n-BUTYL (CIS-1,2-EPOXYPROPYL)PHOSPHONATE

Threo [(1 - di - n-butyloxyphosphinyl)-1-hydroxy-2-propyl]diethylsulfonium iodide (3 mmoles) is dissolved in ethanol and the reaction mixture treated with silver oxide (5 mmoles) over a period of one-half hour. The essentially neutral reaction mixture is concentrated in vacuo and the residue taken up in ether. The ether solution is then washed with water, dried over sodium sulfate and concentrated to yield di-n-butyloxy (cis-1,2-epoxypropyl)phosphonate.

EXAMPLE 6

Disodium (cis-1,2-epoxypropyl)phosphonate

STEP A: THREO-[1-HYDROXY-2-(TRICHLOROACETOXY)PROPYL]PHOSPHONIC ACID

A solution of cis-1-propenylphosphonic acid (0.05 mole), perbenzoic acid (0.06 mole) and trichloroacetic acid (0.06 mole) in benzene (100 cc.) is allowed to stand for two hours at 25° C. The reaction mixture is washed with dilute sodium carbonate solution, dried over magnesium sulfate and concentrated to yield threo-[1-hydroxy-2-(trichloroacetoxy)propyl]phosphonic acid.

STEP B: PYRIDINE SALT OF [1-(METHANESULFONYLOXY)12-ACETOXYPROPYL]PHOSPHONIC ACID

Threo - [1 - hydroxy - 2 - (trichloroacetoxy)propyl] phosphonic acid (2 mmoles) is dissolved in pyridine (10 cc.) and the solution treated with 1.1 equivalents of methanesulfonyl chloride and allowed to stand for 12 hours at room temperature. At the end of the 12-hour period the pyridine is evaporated in vacuo and the residue triturated with ether to yield crude pyridine salt of [1-(methanesulfonyloxy)-2-acetoxypropyl]phosphonic acid.

STEP C: DISODIUM (CIS-1,2-EPOXYPROPYL)PHOSPHONATE

A solution of the pyridine salt of [1-(methanesulfonyloxy)-2-acetoxypropyl]phosphonic acid (1 mmole) in methanol (2 cc.) is titrated with four equivalents of 1 N sodium hydroxide using phenolphthalein as the indicator. Upon evaporation of the methanol at 25° C., extraction of the residue with ether and concentration of the ether in vacuo, the product obtained is identified as disodium (cis-1,2-epoxypropyl)phosphonate.

EXAMPLE 7

Dimethyl (cis-1,2-epoxypropyl)phosphonate

STEP A: THREO DIMETHYL (1-BROMO-2-HYDROXYPROPYL)PHOSPHONATE

A solution of dimethyl cis-1-propenylphosphonate (5 mmoles) in water (12 cc.) is treated with N-bromosuccinimide (6 mmoles) at 0° C. followed by the addition of cold 0.2 N aqueous sulfuric acid (1.5 ml.). After stirring for a period of four to five hours at 0° C., excess N-bromosuccinimide is destroyed by the addition of a few drops of sodium bisulfite solution. The aqueous solution is saturated with sodium chloride, extracted with ether, dried over magnesium sulfate and concentrated to yield threo dimethyl (1-bromo-2-hydroxypropyl)phosphonate.

STEP B: DIMETHYL (CIS-1,2-EPOXYPROPYL)PHOSPHONATE

By substituting threo dimethyl (1-bromo-2-hydroxypropyl) phosphonate for the dimethyl [1-(methanesulfonyloxy)-2-acetoxypropyl]phosphonate of Example 1, Step B, and following the procedure described therein the product dimethyl (cis-1,2-epoxypropyl)phosphonate is obtained.

EXAMPLE 8

Threo dimethyl (cis-1,2-epoxypropyl)phosphonate

STEP A: DIMETHYL THREO [1-(CYCLOHEXYLAMINO)-2-HYDROXYPROPYL]PHOSPHONATE

Bromine is added dropwise to a solution of dimethyl cis-1-propenylphosphonate (5 mmoles) in chloroform (25 cc.) at such a rate that the bromine absorption is matched by the rate of bromine addition. Upon completion of the bromine absorption the solvent is evaporated and the reaction mixture treated with a solution of cyclohexylamine (10 mmoles) in dry benzene (20 cc.) and allowed to stand for a six hour period at 30° C. The reaction mixture is filtered from cyclohexylamine hydrobromide and the solvent evaporated to yield dimethyl (1-cyclohexyl-2-methyl-3-aziridinyl)phosphonate. The ester intermediate thus obtained is then dissolved in 2 N sulfuric acid at 40° C. to effect hydrolysis whereupon the compound dimethyl threo [1 - (cyclohexylamino)-2-hydroxypropyl]phosphonate is obtained.

STEP B: [(1-DIMETHYOXYPHOSPHINYL)-2-HYDROXY-2-PROPYL] - N - CYCLOHEXYL DIMETHYLAMMONIUM IODIDE

By substituting threo dimethyl [1-(cyclohexylamino)-2-hydroxypropyl]phosphonate for the threo di-n-propyl (1-hydroxy-2-aminopropyl)phosphonate of Example 4, Step B and following the procedure described therein [(1-dimethoxyphosphinyl) - 2-hydroxy-2-propyl]-N-cyclohexyl dimethylammonium iodide is obtained.

STEP C: THREO DIMETHYL (CIS-1,2-EPOXYPROPYL) PHOSPHONATE

By substituting [(1-dimethoxyphosphinyl)-2-hydroxy-2-propyl]-N-cyclohexyl dimethylammonium iodide for the [(1-di-n-propyloxyphosphinyl) - 1-hydroxy-2-propyl]trimethylammonium iodide of Example 4, Step C, and following the procedure described therein the product threo dimethyl (cis-1,2-epoxypropyl)phosphonate is obtained.

EXAMPLE 9

Dimethyl (cis-1,2-epoxypropyl)phosphonate

STEP A: THREO DIMETHYL (1-HYDROXY-2-AMINOPROPYL)PHOSPHONATE

A solution of carbobenzoxyalanine p-nitrophenyl ester (0.5 mmoles) in 25 cc. of dimethyl formamide is treated with sodium dimethyl phosphonate (1.0 mmoles) in 10 cc. of dimethyl formamide and the mixture is warmed to 50° C. for one hour. The reaction mixture is then diluted with water and extracted with ether. The ether solution is concentrated, taken up in 25 cc. of methanol, treated with 50 mg. of 10% palladium on charcoal and hydrogenated to the uptake of 2 mole equivalents of hydrogen. The catalyst is removed by filtration and the solvent removed in vacuo. The residue is then distilled under reduced pressure to afford threo dimethyl (1-hydroxy-2-aminopropyl)phosphonate.

STEP B: DIMETHYL (CIS-1,2-EPOXYPROPYL) PHOSPHONATE

A solution of 0.1 mmole of threo dimethyl (1-hydroxy-2-aminopropyl)phosphonate in 50% aqueous acetic acid (15 cc.) is treated with 0.1 mmole of sodium nitrite dissolved in 5 cc. of water. After complete nitrogen evolution the organic product is extracted with ether and the ether solution washed with sodium bicarbonate solution, dried over sodium sulfate and concentrated to yield the dimethyl (cis-1,2-epoxypropyl)phosphonate.

EXAMPLE 10

Threo dimethyl (cis-1,2-epoxypropyl)phosphonate

STEP A: THREO DIMETHYL [1-(PHENYLIMINO)-2-HYDROXYPROPYL]PHOSPHONATE

An equimolecular mixture of dimethyl cis-1-propenylphosphonate and phenylazide are allowed to stand at 25° C. for 24 hours and then warmed until no further nitrogen is evolved. The dimethyl (1,2 N-phenyliminopropyl) phosphonates thus obtained is then dissolved in 2 N sulfuric acid at 40° C. whereupon the compound threo dimethyl [1-(phenylimino)-2-hydroxypropyl]phosphonate is obtained.

STEP B: [(1-DIMETHOXYPHOSPHINYL)-2-HYDROXY-2-PROPYL]-N-PHENYL DIMETHYLAMMONIUM IODIDE

By substituting threo dimethyl [1-(phenylimino)-2-hydroxypropyl]phosphonate for the threo di-n-propyl (1-hydroxy-2-aminopropyl)phosphonate of Example 4, Step B and following the procedure described therein [(1-dimethoxyphosphinyl) - 2-hydroxy-2-propyl]-N-phenyl dimethylammonium iodide is obtained.

STEP C: THREO DIMETHYL (CIS-1,2-EPOXYPROPYL) PHOSPHONATE

By substituting [(1-dimethoxyphosphinyl)-2-hydroxy-2-propyl]-N-phenyl dimethylammonium iodide for the [(1-di-n-propyloxyphosphinyl) - 1-hydroxy-2-propyl]trimethylammonium iodide of Example 4, Step C, and following the procedure described therein the product threo dimethyl (cis-1,2-epoxypropyl)phosphonate is obtained.

EXAMPLE 11

Dimethyl (cis-1,2-epoxypropyl)phosphonate

STEP A: THREO DIMETHYL [1-(n-BUTYLTHIO)-2-ACETOXYPROPYL]PHOSPHONATE n-Butylsulfenyl bromide (0.01 mole) is added dropwise to a solution of dimethyl cis-1-propenylphosphonate (0.01 mole) in methylene chloride (20 cc.) at 20° C. to yield [(1-dimethoxyphosphinyl) - 1,2-propylene]-n-butylsulfonium bromide. Silver acetate (0.076 mole) in nitromethane (10 cc.) is then added and the reaction mixture is stirred and warmed to 50° C. Concentration of the solvent and extraction of the residue with ether yields, on concentration in vacuo, threo dimethyl [1-(n-butylthio)-2-acetoxypropyl]phosphonate.

STEP B: THREO [(1-DIMETHOXYPHOSPHINYL)-1-HYDROXY-2-PROPYL]-DI-n-BUTYLSULFONIUM IODIDE

By substituting threo dimethyl [1-(n-butylthio)-2-acetoxy propyl]phosphonate and n-butyl iodide for the dimethyl [1-hydroxy-2-(ethylthio)propyl]phosphonate and ethyl iodide, recited in Example 5, Step B, and following the procedure described therein, the compound threo [(1-dimethoxyphosphinyl) - 2 - hydroxypropyl]-di-n-butylsulfonium iodide is obtained.

STEP C: DIMETHYL (CIS-1,2-EPOXYPROPYL) PHOSPHONATE

By substituting threo [(1-dimethoxyphosphinyl)-1-hydroxy-2-propyl]-di-n-butylsulfonium iodide and silver oxide for the [(1-dimethoxyphosphinyl)-1-hydroxy-2-propyl]diethylsulfonium iodide and sodium ethoxide recited in Example 5, Step C, and following the procedure described therein, the product dimethyl (cis-1,2-epoxypropyl)phosphonate is obtained.

EXAMPLE 12

Calcium salt of threo (—) (cis-1,2-epoxypropyl)phosphonic acid monohydrate

STEP A: THREO 1R:2R DIMETHYL (1-HYDROXY-2-AMINOPROPYL)PHOSPHONATE

A solution of (±) threo dimethyl (1-hydroxy-2-aminopropyl)phosphonate (5 mmoles) in acetone (25 cc.) is treated with 1 equivalent of d-10-camphorsulfonic acid in an equal volume of acetone. The solvent is evaporated hot to the point of near turbidity. The salt of threo 1R:2R dimethyl (1-hydroxy-2-aminopropyl)phosphonate is isolated and dissolved in water, layered with ether and treated with sodium bicarbonate to a pH of 8. Upon extraction of the aqueous phase the resulting ether solution yields, on evaporation, threo 1R:2R dimethyl (1-hydroxy-2-aminopropyl)phosphonate.

STEP B: [(1-DIMETHOXYPHOSPHINYL)-1-HYDROXY-2-PROPYL]TRIMETHYLAMMONIUM IODIDE

By substituting threo 1R:2R dimethyl (1-hydroxy-2-aminopropyl)phosphonate for the threo di-n-propyl (1-hydroxy-2-aminopropyl)phosphonate of Example 4, Step B, and following the procedure described therein the product [(1-dimethoxyphosphinyl) - 1 - hydroxy-2-propyl]trimethylammonium iodide is obtained.

STEP C: THREO 1R:2R DIMETHYL (CIS-1,2-EPOXYPROPYL)PHOSPHONATE

By substituting [(1-dimethoxyphosphinyl)-1-hydroxy-2-propyl]trimethylammonium iodide for the [(1-di-n-propyloxyphosphinyl)-1-hydroxy - 2 - propyl]trimethylammonium iodide of Example 4, Step C, and following the procedure described therein the product threo 1R:2R-dimethyl (cis-1,2-epoxypropyl)phosphonate is obtained.

15

STEP D: CALCIUM SALT OF THREO (—) (CIS-1,2-EPOXYPROPYL)PHOSPHONIC ACID MONOHYDRATE

A solution of threo 1R:2R dimethyl (cis-1,2-epoxypropyl)phosphonate (1 mmole) and trimethylchlorosilane (10 cc.) is refluxed for eight hours. The reaction mixture is then extracted with water to yield an aqueous solution of threo 1R:2R (cis-1,2-epoxypropyl)phosphonic acid and the said product is then treated with 1 equivalent of calcium hydroxide and the solution evaporated to yield a crystalline solid identified as the calcium salt of threo (—) (cis-1,2-epoxypropyl)phosphonic acid monohydrate.

EXAMPLE 13

Dimethyl ester of threo (—) (cis-1,2-epoxypropyl)phosphonic acid

STEP A: THREO 1R:2R DIMETHYL (1-HYDROXY-2-ETHYLTHIOPROPYL)PHOSPHONATE

A solution of ($\pm$) threo dimethyl (1-hydroxy-2-ethylthiopropyl)phosphonate (5 mmoles) in 10 cc. of pyridine is treated with one equivalent of succinic anhydride and heated on a steam bath. After heating for two hours, the pyridine is evaporated and the hemisuccinate extracted with sodium bicarbonate from which it is releasd by acidification with hydrochloric acid, followed by back-extraction with ether. Evaporation of the solvent yields the 2-hemisuccinate of ($\pm$) threo dimethyl (1-hydroxy-2-ethylthiopropyl)phosphonate which is then converted to its salt with quinine in acetone solution to yield upon isolation the quinine salt of threo 1R:2R dimethyl (1-succinyloxy-2-ethylthiopropyl)phosphonate. The diastereoisomeric salt thus obtained is treated to give threo 1R:2R dimethyl (1-succinyloxy-2-ethylthiopropyl)phosphonate and the intermediate then obtained is dissolved in dilute sodium carbonate solutions, warmed to 50–60° C., extracted from the aqueous solution with ether and the resulting product isolated by evaporation of the solution to yield threo 1R:2R dimethyl (1-hydroxy-2-ethylthiopropyl)phosphonate.

STEP B: THREO 1R:2R[(1-DIMETHOXYPHOSPHINYL)-1-HYDROXY-2-PROPYL]DIETHYLSULFONIUM IODIDE

Threo 1R:2R dimethyl [1-hydroxy-2-(ethylthio)propyl]phosphonate (3 mmoles) is dissolved in benzene and the solution treated with ethyl iodide (10 mmoles). The reaction mixture is then warmed at 80° C. for two hours and the benzene evaporated in vacuo to yield threo 1R:2R [(1-dimethoxyphosphinyl) - 1-hydroxy-2-propyl]diethylsulfonium iodide.

STEP C: DIMETHYL ESTER OF THREO (—) (CIS-1,2-EPOXYPROPYL)PHOSPHONIC ACID

By substituting threo 1R:2R [(1-dimethoxyphosphinyl)-1-hydroxy-2-propyl]diethylsulfonium iodide for the [(1-dimethoxyphosphinyl)-1-hydroxy - 2 propyl]diethylsulfonium iodide recited in Example 5, Step C, and following the procedure described therein, the product threo (—) dimethyl ester of threo (—) (cis-1,2-epoxypropyl)phosphonic acid is obtained.

EXAMPLE 14

Di-n-propyl (cis-1,2-epoxypropyl)phosphonate

STEP A: ($\pm$) THREO DI-n-PROPYL (1-HYDROXY-2-CYCLOHEXAMINOPROPYL)PHOSPHONATE

A solution of 2-(cyclohexylamino)propionaldehyde (5 millimoles) and dipropylphosphite (5 millimoles) in benzene (5 cc.) is allowed to stand for 18 hours. The solvent is evaporated and the residue distilled to yield ($\pm$) threo di-n-propyl (1-hydroxy - 2 - cyclohexylaminopropylphosphonate.

16

STEP B: [(1-DI-n-PROPYLOXYPHOSPHINYL)-1,2-HYDROXY - 2 - PROPYL]-N-CYCLOHEXYLDIMETHYLAMMONIUM IODIDE

By substituting ($\pm$) threo di-n-propyl (1-hydroxy-2-cyclohexylaminopropyl)phosphonate for the threo di-n-propyl (1-hydroxy-2-aminopropyl)phosphonate of Example 4, Step B, and following the procedure described therein the product [(1-di-n-propyloxyphosphinyl)-1-hydroxy-2-propyl]-N-cyclohexyldimethylammonium iodide is obtained.

STEP C: DI-n-PROPYL (CIS-1,2-EPOXYPROPYL) PHOSPHONATE

By substituting [(1-di-n-propyloxyphosphinyl)-1-hydroxy-2-propyl]-N-cyclohexyldimethylammonium iodide for the [(1-di-n-propyloxyphosphinyl)-1-hydroxy-2-propyl]trimethylammonium iodide of Example 4, Step C, and following the procedure described therein the product di-n-propyl (cis-1,2-epoxypropyl)phosphonate is obtained.

EXAMPLE 15

Dimethyl ester of (—) (cis-1,2-epoxypropyl) phosphonic acid

STEP A: THREO DIMETHYL [1-HYDROXY-2-(TRIFLUOROACETOXY)PROPYL]PHOSPHONATE

A solution of the dimethyl ester of (+) (cis-1,2-epoxypropyl)phosphonic acid (0.249 g.) in trifluoroacetic acid (2 ml.) is allowed to stand at room temperature for 6½ hours. Unreacted trifluoroacetic acid is removed in vacuo at room temperature and the residue is then flushed with chloroform and benzene to yield 0.447 g. of threo dimethyl [1 - hydroxy-2-(trifluoroacetoxy)propyl]phosphonate. Max. 3.04 and 5.59$\mu$.

STEP B: THREO DIMETHYL [1-(METHANESULFONYLOXY) - 2 - (TRIFLUOROACETOXY)PROPYL]PHOSPHONATE

Methanesulfonyl chloride (0.26 ml.) in methylene chloride (0.5 ml.) is added to a stirred solution of threo dimethyl [1-hydroxy-2-(trifluoroacetoxy)propyl]phosphonic acid (0.366 g.) in anhydrous methylene chloride (0.5 ml.) and anhydrous pyridine (0.6 ml.) at 0° C. A crystalline solid immediately precipitates out. After standing for 16 hours at 0° C. ice is added to the reaction mixture and the latter is stirred for 45 minutes. The organic layer is separated and the aqueous layer is extracted three times with methylene chloride. The combined organic extracts are then washed with saturated sodium chloride solution, dried over sodium sulfate and evaporated to yield 0.236 g. of threo dimethyl [1-(methanesulfonyloxy)-2-(trifluoroacetoxy)propyl]phosphonate. Max. 5.59 and 7.36$\mu$.

STEP C: DIMETHLY ESTER OF (—) (CIS-1,2-EPOXYPROPYL)PHOSPHONIC ACID

To a stirred solution of threo dimethyl [1-(methanesulfonyloxy) - 2 - (trifluoroacetoxy)propyl]phosphonate (0.224 g.) in methanol (15 ml.) is added 1.082 N sodium hydroxide (95 ml.). Following the removal of methanol at room temperature in vacuo the residue is saturated with sodium chloride and then extracted three times with ether. Upon evaporation the dried ether extracts yield 0.085 g. of oily product identified as dimethyl ester of (cis-1,2-epoxypropyl)phosphonic acid. Upon distillation there is obtained 0.66 g. of dimethyl ester of (—) (cis-1,2-epoxypropyl)phosphonate [$\alpha$]578$\mu$=+6.1, in methanol.

EXAMPLE 16

Monobenzylamine salt of (cis-1,2-epoxypropyl) phosphonic acid

A solution of cis-1-propenylphosphonic acid (1 mmole) in water (10 cc.) is treated with pyridine (1 mmole) and the monopyridinium salt of cis-1-propenylphosphonic acid (2 mmoles) thus obtained is added with stirring to 2.5 equivalents of N-bromosuccinimide and 1 mole equivalent of 10% sulfuric acid until the solution is complete. The monopyridinium salt of (1-bromo-2-hydroxypropenyl)phosphonic acid thus obtained, which also includes some (1-bromo-2-hydroxypropenyl)phosphonic acid, is then treated with 3 equivalents of benzylamine to yield the monobenzylamine salt of (cis-1,2-epoxypropyl) phosphonic acid.

EXAMPLE 17

Disodium (cis-1,2-epoxypropyl)phosphonate

A solution of cis-1-propenylphosphonic acid (1 mmole) in water 15 cc. is treated with sodium hydroxide (2 mmoles) and the disodium salt of cis-1-propenylphosphonic acid (2 mmoles) thus obtained is added with stirring to 2.5 equivalents of N-bromosuccinimide and 1 equivalent of 10% sulfuric acid until the solution is complete. The solution of the disodium salt of (1-bromo-2-hydroxypropyl)phosphonate thus obtained is then treated with two equivalents of 1 N sodium hydroxide to yield disodium (cis-1,2-epoxypropyl)phosphonate.

By substituting 1 mmole of calcium hydroxide for the 2 moles of sodium hydroxide recited in the foregoing example, the calcium salt of cis-1-propenylphosphonic acid is obtained, which salt upon treatment with N-bromosuccinimide and a 10% sulfuric acid solution according to the method described in Example 1 affords the calcium salt of (1-bromo-2-hydroxypropyl)phosphonic acid, and the intermediate thus obtained may then be treated with one equivalent of calcium hydroxide to yield calcium (cis-1,2-epoxypropyl)phosphonate monohydrate.

EXAMPLE 18

Di-isopropyl ester of (—) (cis-1,2-epoxypropyl) phosphonic acid

STEP A: 2R DI-ISOPROPYL (2-CHLOROPROPIONYL) PHOSPHONATE

To a solution of 0.1 mole of 2 R chloropropionylchloride in 80 ml. of anhydrous toluene is added dropwise 0.1 mole of tri-isopropyl phosphite over a period of 30 minutes at 20–30° C. After the addition is complete, the mixture is warmed up to 70° C. until the evolution of isopropyl chloride ceases. The solvent is then removed in vacuo and the residue crude 2 R di-isopropyl (2-chloropropionyl)phosphonate is used directly in the next step.

STEP B: 1R:2R DI-ISOPROPYL (1-HYDROXY-2-CHLOROPROPYL)PHOSPHONATE

To a stirred suspension of 0.05 mole of lithium tritertbutoxyaluminum hydride in 60 ml. of ether:diglyme solvent mixture (1:1) at —30° C. is added dropwise a solution of 0.045 mole of 2 R di-isopropyl (2-chloropropionyl)phosphonate in 30 ml. of ether. The mixture is allowed to stand overnight at 0° C. and the resulting complex is then hydrolyzed and any excess of reagent is destroyed by pouring the reaction mixture onto 150 ml. of 2% acetic acid. Evaporation of the washed and dried ethereal extract affords 1 R:2 R di-isopropyl (1-hydroxy-2-chloropropyl)phosphonate.

STEP C: DI-ISOPROPYL ESTER OF (—) (CIS-1,2-EPOXYPROPYL)PHOSPHONIC ACID

To a solution of 0.05 mole of 1R:2R di-isopropyl (1-hydroxy-2-chloropropyl)phosphonate in 100 ml. isopropanol is added 0.05 mole of potassium isopropoxide in 80 ml. of anhydrous isopropanol. The mixture is aged overnight at room temperature and the precipitated potassium chloride is then filtered off. Evaporation of the filtrate in vacuo affords the di-isopropyl ester of (—) (cis-1,2-epoxypropyl)-phosphonic acid.

EXAMPLE 19

Dimethyl (cis-1,2-epoxypropyl)phosphonate

STEP A: DIMETHYL (O-BENZYLLACTOYL) PHOSPHONATE

To a solution of 0.1 mole of O-benzyllactoylchloride in 80 ml. of anhydrous ether is added dropwise 0.1 mole of trimethylphosphite over a period of about one hour at room temperature. After the addition of trimethylphosphite the mixture is heated to 30–35° C. until the evolution of methylchloride ceases. The ether is then removed by distillation and the crude dimethyl (O-benzyllactoyl)-phosphonate used directly in the next step.

STEP B: DIMETHYL (2-BENZYLOXY-1-HYDROXYPROPYL)PHOSPHONATE

To a solution of 0.1 mole of dimethyl (O-dibenzyllactoyl)phosphonate in 80 ml. of methanol is added a solution of 0.03 mole of sodium borohydride in methanol with stirring at 5–10° C. The mixture is aged for 10 hours and the pH of the solution is then adjusted to 6.0 by the dropwise addition of 1 N hydrochloric acid. Upon removal of the solvent in vacuo there is obtained crude dimethyl (2-benzyloxy-1-hydroxypropyl)phosphonate.

STEP C: DIMETHYL (2-BENZYLOXY-1-MESYLOXYPROPYL)PHOSPHONATE

Dimethyl (2 - benzyloxy-1-hydroxypropyl)phosphonate (0.1 mole) is dissolved in 160 ml. of anhydrous ether containing 0.105 mole of pyridine. The solution is cooled to 10° C. and 0.1 mole of methanesulfonylchloride is added dropwise while maintaining the temperature between 5° and 10° C. After aging the mixture overnight at room temperature the precipitated pyridine-hydrochloride is filtered off and the solvent is removed in vacuo to yield dimethyl (2-benzyloxy-1-mesyloxypropyl)phosphonate.

STEP D: DIMETHYL (CIS-1,2-EPOXYPROPYL) PHOSPHONATE

A solution of 0.1 mole dimethyl (2-benzyloxy-1-mesyloxypropyl)phosphonate in 250 ml. of dioxane is hydrogenated over a 5% Pd/C (8.0 g.) until the theoretical amount of hydrogen is adsorbed followed by treatment with 0.1 mole of sodium methoxide in 200 ml. of anhydrous methanol. The mixture is then filtered to remove the catalyst and sodium methanesulfonate. The residue is washed with dioxane and the filtrate concentrated in vacuo to yield dimethyl (cis-1,2-epoxypropyl)phosphonate.

EXAMPLE 20

Diethyl ester of (cis-1,2-epoxypropyl)phosphonate

STEP A: BENZYL-2-TOSYLOXYPROPIONATE

Benzyl lactate (0.1 mole) is dissolved in 150 ml. of anhydrous benzene containing 0.105 mole of pyridine. The solution is cooled to 10° C. and 0.1 mole of p-toluenesulfonylchloride is added portionwise with stirring and external cooling. After aging the mixture at room temperature for 10 hours the pyridine hydrochloride is filtered off and the solvent is removed in vacuo to yield benzyl-2-tosyloxypropionate.

STEP B: 2-TOSYLOXYPROPIONIC ACID

A solution of 0.1 mole of crude benzyl-2-tosyloxypropionate in 250 ml. of dioxane is hydrogenated at 25° C. over 5 g. of a 5% palladium-on-charcoal catalyst. After 0.1 mole of hydrogen is absorbed, the catalyst is filtered off and the filtrate is concentrated in vacuo to yield 2-tosyloxypropionic acid.

STEP C: 2-TOSYLOXYPROPIONYLCHLORIDE

A mixture of 0.1 mole of 2-tosyloxypropionic acid and 0.2 mole of thionyl chloride is warmed at 40° C. for four hours. Upon completion of the reaction excess of thionyl chloride is removed in vacuo and the residual crude 2-tosyloxypropionylchloride is used directly in the next step.

STEP D: DIETHYL (2-TOSYLOXYPROPIONYL) PHOSPHONATE

Method 1: To a solution of 26.25 g. (0.1 mole) of 2-tosyloxypropionylchloride in 60 ml. of anhydrous benzene is added dropwise 16.6 g. (0.1 mole) of triethylphosphite over a period of about 45–50 minutes while maintaining the temperature between 20–25° C. by external cooling. After the addition of triethylphosphite, the mixture is aged at 25° C. for one hour and then heated to 50–55° C. until the evolution of ethylchloride ceases. The residual diethyl (2-tosyloxypropionyl)phosphonate thus obtained may be used directly in Step E.

Method 2: To a solution of 69 g. (0.5 mole) of diethyl hydrogenphosphite in 500 ml. of anhydrous ether is added 4.6 g. of sodium with stirring and external cooling. After all of the sodium is reacted 52.5 g. of 2-tosyloxypropionylchloride is added portionwise while maintaining the temperature at about 20–25° C. by external cooling. The mixture is then stirred for five hours and the precipitated sodium chloride is filtered off. The ether is removed by distillation to yield diethyl (2-tosyloxypropionyl)phosphonate.

STEP E: DIETHYL (1-HYDROXY-2-TOSYLOXY PROPYL)PHOSPHONATE

To a stirred solution of 11.16 g. diethyl (2-tosyloxypropionyl)phosphonate in 45 ml. of methanol is added a solution of 1.2 g. of sodium borohydride in methanol with stirring over 30 miuntes at 5–10° C. The stirring is continued for an additional six hours and then 1 N hydrochloric acid is added with cooling and stirring to adjust the pH to 5.5–6. The crude product is obtained after the removal of the solvent in vacuo. Upon removal of the solvent there is obtained crude diethyl (1-hydroxy-2-tosyloxypropyl)phosphonate.

STEP F: DIETHYL ESTER OF (—) (CIS-1,2-EPOXYPROPYL)PHOSPHONATE

Crude diethyl (1-hydroxy-2-tosyloxypropyl)phosphonate (37.4 g.) is dissolved in 200 ml. of anhydrous dioxane. To this solution is added dropwise at —5° to 0° C., 2.3 g. sodium in 200 ml. of isopropanol. The reaction mixture is aged at 0° C. for 12 hours with stirring and the precipitated sodium p-toluenesulfonate is filtered off and the residue is washed with dioxane and the combined filtrate and washes are concentrated in vacuo to yield crude diethyl ester of (—) (cis-1,2-epoxypropyl) phosphonates.

EXAMPLE 21

Dimethyl (cis-1,2-epoxypropyl)phosphonate

STEP A: DIMETHYL (1-HYDROXY-2-PHENOXYPROPYL)PHOSPHONATE

A solution of 0.2 mole of 2-chloropropionaldehyde and 0.25 mole of sodium phenoxide in 50 cc. of dimethylsulfoxide is stirred for two hours, poured into ice water and extracted with ether. The ether solution is washed with dilute sodium hydroxide and then with water and dried over magnesium sulfate. Concentration of the solvent provides crude 2-phenoxypropionaldehyde which is treated directly with 0.2 mole of dimethyl phosphite and two drops of triethylamine. After standing for 18 hours the reaction mixture is distilled to afford dimethyl (1-hydroxy-2-phenoxypropyl)phosphonate.

STEP B: DIMETHYL (CIS-1,2-EPOXYPROPYL) PHOSPHONATE

A solution of dimethyl (1-hydroxy-2-phenoxypropyl)phosphonate (1 mmole) in methanol (2 cc.) is titrated with 1 N sodium hydroxide using phenolphthalein as the indicator. The total amount of base consumed is 2.0 mmoles. Upon evaporation of the methanol at 50° C., extraction of the residue with ether and concentration of the ether in vacuo, the product obtained is identified as dimethyl (cis-1,2-epoxypropyl)phosphonate.

EXAMPLE 22

Dimethyl (cis-1,2-epoxypropyl)phosphonate

STEP A: DIMETHYL (1-HYDROXY-2-AZIDOPROPYL) PHOSPHONATE

A solution of 0.2 mole of 2-chloropropionaldehyde and 0.2 mole of sodium azide in 50 cc. of dimethylsulfide is warmed at 50° C. for 2 hours, quenched with water and extracted with ether. Concentration of the ether affords 2-azidopropionaldehyde and the intermediate thus obtained is treated with dimethylphosphite and triethylamine and distilled in the manner described in Example 21 to afford dimethyl (1-hydroxy-2-azidopropyl)phosphonate.

STEP B: DIMETHYL (CIS-1,2-EPOXYPROPYL) PHOSPHONATE

By substituting dimethyl (1-hydroxy-2-azidopropyl)phosphonate for the dimethyl (1-hydroxy-2-phenoxypropyl)phosphonate recited in Example 21, Step B, and following the procedure described therein dimethyl (cis-1,2-epoxypropyl)phosphonate is obtained.

EXAMPLE 23

Diethyl (cis-1,2-epoxypropyl)phosphonate

By substituting 3,3-dimethyl-butanoic acid chloride for the [1 - (methanesulfonyloxy)-2-acetoxypropyl]phosphonate recited in Example 2, Step B, and following the procedure described therein the compound threo-diethyl [1-(3,3-dimethylbutanoyloxy)-2-acetoxypropyl]phosphonate is obtained, which, when treated according to the method described in Step C of that example, yields diethyl (cis-1,2-epoxypropyl)phosphonate.

EXAMPLE 24

By substituting chloro diethylphosphite for methanesulfonyl chloride recited in Example 2, Step B, and following the procedure described therein the compound dimethyl [1-(diethoxyphosphino)-2-acetoxypropyl]phosphonate is obtained, which, when treated according to the method described in Step C of that example, yields diethyl (cis-1,2-epoxypropyl)phosphonate.

EXAMPLE 25

Dimethyl (cis-1,2-epoxypropyl)phosphonate

A solution of threo dimethyl (1-hydroxy-2-chloropropyl)phosphonate (0.05 mole) in methanol (2 cc.) is treated with 10 mole equivalents of silver acetate in 25 cc. of acetic acid at 5–10° C. for three to four hours, followed by filtration and watering out of the product. The product thus obtained is then extracted with ether and washed neutral with bicarbonate solution to afford the dimethyl (cis-1,2-epoxypropyl)phosphonate.

EXAMPLE 26

Dimethyl (cis-1,2-epoxypropyl)phosphonate

STEP A: DIMETHYL [1-[N-(p-TOLUENESULFONYL)CYCLOHEXYLAMINO] - 2 - ACETOXYPROPYL]PHOSPHONATE

A solution of dimethyl (1-cyclohexyl-2-methyl-3-aziridinyl)phosphonate (5.0 mmoles) in 20 cc. of acetic acid containing sodium acetate (5.0 mmoles) is refluxed for three hours, cooled, treated with water and extracted with ether. The ether extract is washed free of acid with sodium bicarbonate, dried, and the solvent evaporated to afford dimethyl [1-(cyclohexylamino)-2-acetoxypropyl]phosphonate. The said phosphonate is then added to pyridine (15 cc.), treated with p-toluenesulfonyl chloride (5.0 mmoles) and allowed to stand for twelve hours. The reaction product is then treated with water and extracted with ethyl acetate. The organic layer is washed successively with dilute hydrochloric acid and sodium bicarbonate solution, dried over magnesium sulfate and concentrated to yield dimethyl [1-[N-(p-toluenesulfonyl)cyclohexylamino]-2-acetoxypropyl]phosphonate.

STEP B: DIMETHYL (CIS-1,2-EPOXYPROPYL) PHOSPHONATE

By substituting dimethyl [1-[N-(p-toluenesulfonyl)cyclohexylamino]-2-acetoxypropyl]phosphonate for the [(1-di-n-propyloxyphosphinyl)-1-hydroxy-2-propyl]trimethylammonium iodide of Example 4, Step C, and following the procedure described therein, the product dimethyl (cis-1,2-epoxypropyl)phosphonate is obtained.

EXAMPLE 27

Dimethyl (cis-1,2-epoxypropyl)phosphonate

STEP A: DIMETHYL (1,2-DIHYDROXYPROPYL) PHOSPHONATE

A solution of 2-hydroxypropionaldehyde (10 mmoles) in benzene (5.0 cc.) is treated with dimethylphosphite (10 mmoles) and two drops of triethylamine and allowed to stand for 20 hours. The organic phase is washed free of triethylamine with dilute hydrochloric acid followed by a washing with soduim bicarbonate and water. The resulting solution is then dried over magnesium sulfate and the solvent evaporated to yield dimethyl (1,2-dihydroxypropyl)phosphonate.

STEP B: DIMETHYL CIS-1,2-EPOXYPROPYL) PHOSPHONATE

A solution of dimethyl (1,2-dihydroxypropyl)phosphonate (5.0 mmoles) in anhydrous chloroform (35 cc.) is stirred at 50° C. with phosphorous pentoxide (1.0 g.) for three hours. The solution is then decanted, washed with sodium bicarbonate solution and concentrated to yield dimethyl (cis-1,2-epoxypropyl)phosphonate.

EXAMPLE 28

Diethyl (cis-1,2-epoxypropyl)phosphonate

A solution of dimethyl (1-hydroxy-2-acetoxypropyl) phosphonate (5.0 mmoles) in 25 cc. of dimethoxyethane is treated with potassium tert.-butoxide (5.0 mmoles) at 30° C. for five hours. The reaction mixture is then filtered and the organic phase washed with water, dried over magnesium sulfate and concentrated to yield diethyl (cis-1,2-epoxypropyl)phosphonate.

EXAMPLE 29

Disodium salt of (cis-1,2-epoxypropyl) phosphonic acid

A solution of cis-1-propenylphosphonic acid (0.1 mole) in 40 cc. of acetic acid is treated with peracetic acid (0.1 mole) at 25° C. After six hours the reaction mixture is treated with sodium bisulfite (0.01 mole), concentrated to dryness and flushed with benzene. The residue is dissolved in pyridine (30 cc.) and treated with thionyl chloride (0.3 mole) and allowed to stand for 16 hours. Upon removal of the major portion of the volatiles under reduced pressure the residue is treated with sodium hydroxide (0.5 mole) in 50 cc. of water. After standing for one hour, there is obtained a solid product identified as the disodium salt of (cis-1,2-epoxypropyl)phosphonic acid.

EXAMPLE 30

Disodium salt of (cis-1,2-epoxypropyl) phosphonic acid (2-acetoxy-1-hydroxypropyl)phosphonic acid (0.05 mole) is dissolved in hexafluoroacetone acid (20 cc.) and allowed to stand for 12 hours. Excess hexafluoroacetone is removed in vacuo and the residue treated with 0.2 mole of sodium hydroxide in 20 cc. of water to yield the disodium salt of (cis-1,2-epoxypropyl)phosphonic acid.

($\pm$) and ($-$) (cis-1,2-epoxypropyl)phosphonic acid and its corresponding salts and ester derivatives (I) may be obtained simply by substituting the appropriate starting materials for those described in Example 1, Steps A, B and C. Thus, for example, by substituting a suitable phosphite, an appropriately substituted aldehyde and the desired base for the dimethyl phosphite, 2-chloropropionaldehyde and the sodium hydroxide reagent recited in Example 1, Steps A, B and C and following the procedure described therein all of the 1,2-disubstituted n-propylphosphonate intermediates identified as IIk, infra, the desired (cis-1,2-epoxypropyl)phosphonic acid product and the salts and ester derivatives thereof may be obtained. The following equation illustrates the reaction of Example 1, Steps A, B and C and, in conjunction with Table I, infra, describe the several varieties of phosphites and propionaldehyde starting materials which may be employed in the process of this invention and the 1,2-disubstituted n-propylphosphonate intermediates (IIk, infra), (cis-1,2-epoxypropyl)phosphonic acid product (Ib) and corresponding phosphonate analogs (Ia and Ic) derived therefrom:

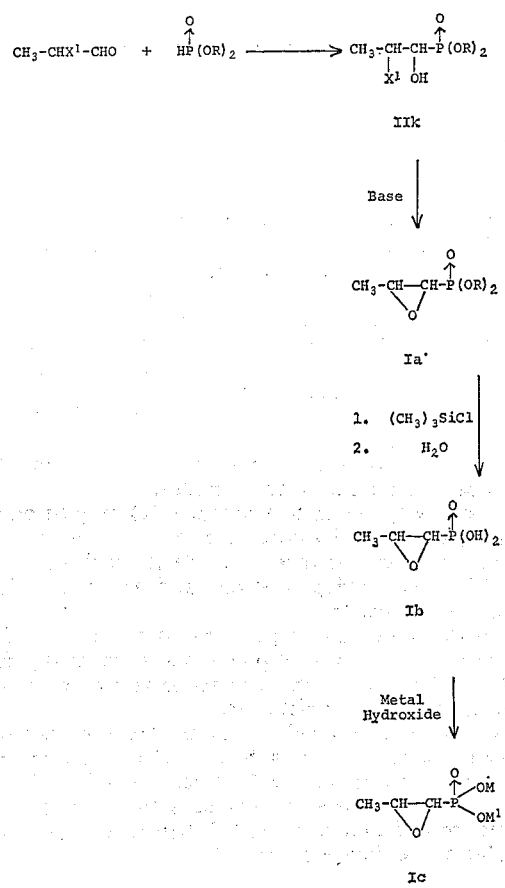

TABLE I

| Example | —OR | X¹ | M | M¹ | Moles of base | Base |
|---|---|---|---|---|---|---|
| 31 | —O—C₆H₅ (—O-phenyl) | —OSO₂C₂H₅ | K | K | 2 | Pyridine. |
| 32 | —OCH₂—C₆H₅ | Br | —Ca— | | 1 | Do. |
| 33 | —OCH₂—CH₂—C₆H₅ | I | Na | H | 1 | NaOH. |
| 34 | —OCH₃ | —O–C(=O)–CH₂–CH₃ | Na | Na | 2 | NaOH. |
| 35 | —CH(CH₃)₂ | —O–C(=O)–CH₂–CF₃ | —Mg— | | 2 | AgO. |
| 36 | —OC₂H₅ | —O–C(=O)–C₆H₅ | —Mg— | | 1 | NaOH. |
| 37 | —OCH₃ | —O–C(=O)–CH₂–CCl₃ | Li | Li | 2 | AgO. |
| 38 | —OCH₃ | —O–C(=O)–C₆H₄–CH₃ | —Cd— | | 1 | NaOC₂H₅. |
| 39 | —O—C₆H₅ | —O–C(=O)–naphthyl | | | 0 | Pyridine. |
| 40 | —O(CH₂)₃CH₃ | —O–C(=O)–CH₂–C₆H₅ | K | H | 1 | NaOCH₃. |
| 41 | —(CH₂)₂CH₃ | —O–C(=O)–CH₂–naphthyl | K | K | 2 | Pyridine. |
| 42 | —OLi | —OSO₂CH₃ | Na | Na | 2 | NaOH. |

The products of this invention can be administerd in a wide variety of therapeutic dosages in conventional vehicles as, for example, by oral administration in the form of a capsule or tablet or in a liquid solution or suspension. Suitable formulations may include diluents, granulating agents, preservatives, binders, flavoring agents and coating agents which are well known to those skilled in this particular art and the dosage of the products may be varied over a wide range as, for example, in the range of from about 500 mg. to about 4.0 g. per day of active ingredient per adult for the symptomatic adjustment of the dosage to the patient to be treated.

Alternatively, the instant products (I) may be administered parenterally by injection in a sterile excipient and for this purpose it is most desirable to employ a salt of (cis-1,2-epoxypropyl)phosphonic acid which is soluble in the liquid vehicle.

It is also within the scope of this invention to combine two or more of the instant products in a unit dosage form or to combine one or more of the instant products with other known antibacterial agents.

The following examples illustrate the preparation of a representative dosage; it being understood that other salts of (cis-1,2-epoxypropyl)phosphonic acid and other pharmaceutical vehicles may be substituted for the active ingredient and excipients recited therein to obtain other suitable active dosage forms:

EXAMPLE 43

Dry-filled capsule containing 330 mg. of active ingredient per capsule

| | Per capsule, mg. |
|---|---|
| Anhydrous disodium (±) (cis-1,2-epoxypropyl) phosphonate | 330 |
| Lactose, sufficient to fill a No. 0 capsule | 145 |
| Capsule size number | 475 |

The anhydrous disodium (±) (cis-1,2-epoxypropyl) phosphonate is reduced to a No. 60 powder and then lactose and magnesium stearate are passed through a No. 60 bolting cloth onto the powder and the combined ingredients admixed for 10 minutes. After a uniform blend is obtained the solids are milled to a particle size of less than 10 microns and then filled into No. 0 dry-gelatin capsules.

By substituting 352.5 mg. of calcium (±) (cis-1,2-epoxypropyl)phosphonate monohydrate for the anhydrous disodium (±) (cis-1,2-epoxypropyl)phosphonate of the above example and otherwise following the procedure described therein a similar dry-filled capsule suitable for oral administration is obtained.

EXAMPLE 44

Tablets containing 352.5 mg. of active ingredient per tablet

| | Per tablet, mg. |
|---|---|
| Calcuim (±) (cis - 1,2 - epoxypropyl)phosphonate | 352.5 |
| Dicalcium phosphate | 180 |
| Lactose U.S.P. | 179.5 |
| Cornstarch | 80 |
| Magnesium stearate | 8 |
| | 800.0 |

The calcium (±) (cis-1,2-epoxypropyl)phosphonate is blended with dicalcium phosphate, lactose and 40 mg. of cornstarch. The mixture is then granulated with a 15% cornstarch paste, rough-screened, dried at 45° C. and screened through a No. 16 screen. Additional cornstarch (40 mg.) and magnesium stearate are added and the mixture compressed into one-half inch diameter tablets each weighing about 800 mg.

EXAMPLE 45

Oral liquid containing 132 g. of active ingredient

| | Per 1000 ml. |
|---|---|
| Disodium (±) (cis-1,2 - epoxypropyl)phosphonate | gm 132.0 |
| Sucrose | gm 600.0 |
| Glucose | gm 250.0 |
| Citric acid | gm 13.0 |
| Sodium benzoate | gm 1.0 |
| Concentrated orange oil | ml 0.2 |
| Purified water, U.S.P. to make 1000.0 ml. | |

The sucrose and glucose are dissolved in about 400 ml. of water with heating. The solution is then cooled and citric acid, sodium benzonate and orange oil are added. The solution is brought to a volume of about 900 ml. with water and disodium (±) (cis-1,2-epoxypropyl) phosphonate is added. The solution is filtered and brought to a volume of 1000 ml.

What is claimed is:

1. A compound of the formula:

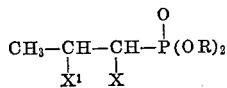

wherein R is lower alkyl, X is hydroxy and X¹ is di-lower alkylsulfonium halide.

2. The compound of claim 1 wherein X¹ is diethylsulfonium iodide or di-n-butylsulfonium iodide.

3. Threo [(1-di-n-butyloxyphosphinyl) - 1-hydroxy-2-propyl]diethylsulfonium iodide.

4. Threo [(1-dimethoxyphosphinyl)-1-hydroxy-2-propyl]di-n-butylsulfonium iodide.

5. Threo 1R:2R [(1-dimethoxyphosphinyl)-1-hydroxy-2-propyl]diethylsulfonium iodide.

6. A method for the preparation of a compound of the formula:

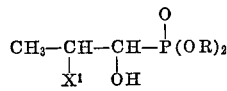

wherein R is lower alkyl and X¹ is di-lower alkylsulfonium, which comprises treating a compound of the formula:

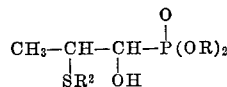

wherein R² is lower alkyl and R is as defined above, with a lower alkyl halide.

7. The method of claim 6 wherein the lower alkyl halide is ethyl iodide or n-butyl iodide.

8. The method of claim 6 whereby threo di-n-butyl [1-hydroxy-2-(ethylthio)propyl]phosphonate is treated with ethyl iodide to afford threo [(1-di-n-butyloxyphosphinyl)-1-hydroxy-2-propyl]diethylsulfonium iodide.

9. The method of claim 6 whereby threo dimethyl [1-(n-butylthio)-2-acetoxypropyl]phosphonate is treated with n-butyl iodide to afford threo [(1-dimethoxyphosphinyl)-1-hydroxy-2-propyl]di-n-butylsulfonium iodide.

10. The method of claim 6 whereby threo 1R:2R dimethyl (1-hydroxy-2 - ethylthiopropyl)phosphonate is treated with ethyl iodide to afford threo 1R:2R [(1-dimethoxyphosphinyl) - 1 - hydroxy-2-propyl]diethylsulfonium iodide.

References Cited
UNITED STATES PATENTS 3,207,776  9/1965  Gilbert ............ 260—969

OTHER REFERENCES

Reid, E.: Organic Chemistry of Bivalent Sulfur, N.Y., Chemical Publishing Co. (1960), p. 66–68.

ALEX MAZEL, Primary Examiner

B. DENTZ, Assistant Examiner